United States Patent
Kim et al.

(10) Patent No.: US 9,952,921 B2
(45) Date of Patent: Apr. 24, 2018

(54) SYSTEM AND METHOD FOR DETECTING AND PREDICTING ANOMALIES BASED ON ANALYSIS OF TIME-SERIES DATA

(71) Applicant: SAMSUNG SDS CO., LTD., Seoul (KR)

(72) Inventors: Sundeuk Kim, Seoul (KR); Hyuntaek Oh, Seoul (KR); Sungil Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 197 days.

(21) Appl. No.: 14/582,746

(22) Filed: Dec. 24, 2014

(65) Prior Publication Data

US 2016/0103724 A1   Apr. 14, 2016

(30) Foreign Application Priority Data

Oct. 10, 2014   (KR) .................. 10-2014-0136765

(51) Int. Cl.
*G06F 11/00*      (2006.01)
*G06F 11/07*      (2006.01)

(52) U.S. Cl.
CPC .......... *G06F 11/079* (2013.01); *G06F 11/008* (2013.01); *G06F 11/0751* (2013.01); *G06F 11/0787* (2013.01)

(58) Field of Classification Search
CPC . G06N 99/005; G06F 11/0727; G06F 11/076; G06F 11/201; G06F 11/0751; G06F 11/0709; G06F 11/0793; G06F 11/3006; G06F 11/302; G06F 11/3082; H04L 67/1097

See application file for complete search history.

(56) References Cited

U.S. PATENT DOCUMENTS 3,613,418 A  * 10/1971  Nara et al. .............. B21B 37/76
                                          266/113
6,138,112 A  * 10/2000  Slutz ................... G06F 11/3672
                                          707/748
6,247,137 B1 *  6/2001  Wickeraad ................ G06F 1/12
                                          713/401

(Continued)

*Primary Examiner* — Bryce P Bonzo
*Assistant Examiner* — Jeison C Arcos
(74) *Attorney, Agent, or Firm* — Sughrue Mion, PLLC (57) ABSTRACT

Provided are a system and method for detecting and predicting anomalies based on analysis of time-series data. According to an embodiment of the present disclosure, an abnormality detecting and predicting system includes a database configured to store past case data related to a state of a monitored object; a data collector configured to collect time-series status information of the monitored object; an abnormality detector configured to compare the status information with an abnormality detecting reference in a preset detecting interval and detect an occurrence of an abnormality of the monitored object; a similar case selector configured to select a similar case having a highest degree of similarity to the status information among the past case data when the occurrence of an abnormality is detected by the abnormality detector; and a predictor configured to predict proliferation or diminishing of a detected abnormality using the similar case and an abnormality proliferation predicting reference.

17 Claims, 5 Drawing Sheets

(56) References Cited

U.S. PATENT DOCUMENTS

| | | | | |
|---|---|---|---|---|
| 6,986,076 | B1* | 1/2006 | Smith | G06F 11/004 714/4.11 |
| 7,480,816 | B1* | 1/2009 | Mortazavi | G06F 11/1482 714/10 |
| 7,886,182 | B1* | 2/2011 | Coatney | G06F 11/2028 714/11 |
| 8,868,987 | B2* | 10/2014 | Wagner | G06F 11/301 714/57 |
| 2004/0059805 | A1* | 3/2004 | Dinker | G06F 11/2069 709/223 |
| 2005/0114174 | A1* | 5/2005 | Raden | G06Q 50/22 705/2 |
| 2010/0318487 | A1* | 12/2010 | Marvasti | G06N 99/005 706/47 |

* cited by examiner

SYSTEM AND METHOD FOR DETECTING AND PREDICTING ANOMALIES BASED ON ANALYSIS OF TIME-SERIES DATA

CROSS-REFERENCE TO RELATED APPLICATION

This application claims priority to Korean Patent Application No. 10-2014-0136765, filed on Oct. 10, 2014, the disclosure of which is incorporated herein by reference in its entirety.

BACKGROUND

1. Field

Embodiments of the present disclosure relate to a system and a method for detection of an abnormality based on analysis of time-series data and prediction of proliferation or diminishing of a detected abnormality.

2. Discussion of Related Art

As most work in companies or government agencies is being computerized, establishment and management of large-scale enterprise service infrastructures by such companies have been made a matter of routine. Such enterprise service infrastructures include a number of web servers, web application servers (WAS), databases, firewalls, switches, routers, and the like. Since there are cases in which an abnormality can affect other devices, or even an entire system, a consistent status monitoring system is needed.

In order to realize such a monitoring system, conventionally, status information (i.e., a central processing unit (CPU) usage rate, a memory usage rate, storage device status information, etc.) has been collected from each device, and the monitoring system has been accomplished by notifying an administrator when collected information has exceeded a preset threshold value. However, since such a conventional method involves determining a result simply by checking whether or not acquired data exceeds a threshold value, there is a limitation on predicting how an abnormality that has occurred will progress.

SUMMARY

Embodiments of the present disclosure provide a method of promptly detecting an abnormality of a monitored object through a combination of time-series data collected in real time and past case data, and effectively predicting proliferation or diminishing of the detected abnormality.

According to an exemplary embodiment of the present disclosure, an abnormality detecting and predicting system is provided. The system includes a database configured to store past case data related to a state of a monitored object; a data collector configured to collect status information in time series from the monitored object; an abnormality detector configured to compare the status information, in a preset detecting interval, with an abnormality detecting reference and detect an occurrence of an abnormality of the monitored object; a similar case selector configured to select a similar case having a highest degree of similarity to the status information among the past case data when the occurrence of the abnormality is detected by the abnormality detector; and a predictor configured to predict proliferation or diminishing of a detected abnormality using the similar case and an abnormality proliferation predicting reference.

The abnormality detecting reference may include a length of the detecting interval, a threshold value of occurrence of an abnormality, and at least one reference pattern of abnormality detection.

The abnormality detector may determine that the abnormality has occurred in the monitored object when there is at least one value exceeding the threshold value of the occurrence of the abnormality in the status information in the detecting interval, or the status information matches one of the reference patterns of the abnormality detection.

The abnormality detector may output a warning message when the abnormality is determined to have occurred in the monitored object.

The similar case selector may compare one or more patterns of the past case data with a pattern of the status information in the detecting interval, and may select an optimal past case data having a highest degree of similarity to the pattern of the status information as the similar case.

The predictor may predict that a detected abnormality is proliferated when the similar case is relevant to an abnormality proliferating case or the status information satisfies the abnormality proliferation predicting reference, and may predict that the detected abnormality diminishes when the similar case is relevant to an abnormality diminishing case and the status information does not satisfy the abnormality proliferation predicting reference, the prediction being a prediction result.

The predictor may determine that the abnormality proliferation predicting reference is satisfied when an average value of the status information in the detecting interval exceeds a preset threshold value of an abnormality detection, or more than a predetermined number of values exceeding a threshold value of the occurrence of the abnormality are included in the status information in the detecting interval.

The system may further include an abnormality detecting reference updater configured to adjust a length of the detecting interval based on the prediction result of the predictor and a change of the status information in a preset verification interval.

The verification interval may start from a time of occurrence of the abnormality in the detecting interval and may end at an additional preset time interval after an ending of the detecting interval.

The verification interval may start from an ending of the detecting interval and may end after an additional preset time interval.

The abnormality detecting reference updater may compare the one or more patterns of the past case data with a pattern of the status information in the verification interval, and may adjust the length of the detecting interval based on the prediction result and the abnormality proliferating case or the abnormality diminishing case of past case data having highest similarity to the pattern of the status information in the verification interval.

The abnormality detecting reference updater may extend a length of the detecting interval when the status information in the verification interval is similar to a proliferating case among the past case data, even if the predictor has predicted that the abnormality may diminish, and may reduce the length of the detecting interval when the predictor has predicted that the abnormality may diminish and the status information in the verification interval is similar to a diminishing case among the past case data.

The abnormality detecting reference updater may extend a length of the detecting interval when the status information in the verification interval is similar to a diminishing case among the past case data, even if the predictor has predicted that the abnormality may proliferate, and may reduce the length of the detecting interval when the status information in the verification interval is similar to a proliferating case among the past case data and the predictor has predicted that the abnormality may proliferate.

According to another exemplary embodiment of the present disclosure, a method of detecting and predicting an abnormality is provided. The method includes collecting status information in time series from a monitored object; comparing the status information and an abnormality detecting reference in a preset detecting interval, and detecting an occurrence of an abnormality of the monitored object; selecting a similar case having a highest degree of similarity to the status information among past case data when the occurrence of the abnormality is detected; and predicting proliferation or diminishing of a detected abnormality using the similar case and an abnormality proliferation predicting reference.

The abnormality detecting reference may include a length of the detecting interval, a threshold value of occurrence of an abnormality, and at least one reference pattern of abnormality detection.

The detecting of the occurrence of the abnormality may include determining that the abnormality has occurred in the detecting interval when one or more values in the status information exceed the threshold value of the occurrence of the abnormality in the detecting interval, or the status information matches one of the reference patterns of the abnormality detection.

The detecting of the occurrence of the abnormality may further include outputting a warning message when the abnormality is determined to have occurred in the monitored object.

The selecting of the similar case may include comparing one or more patterns of the past case data with a pattern of the status information in the detecting interval, and selecting an optimal past case data having a highest degree of similarity to the pattern of the status information as the similar case.

The predicting may include predicting that a detected abnormality is proliferated when the similar case is relevant to an abnormality proliferating case or the status information satisfies the abnormality proliferation predicting reference, and predicting that the detected abnormality diminishes when the similar case is relevant to an abnormality diminishing case and the status information does not satisfy the abnormality proliferation predicting reference, the prediction being a prediction result.

The predicting may include determining that the abnormality proliferation predicting reference is satisfied when an average value of the status information in the detecting interval exceeds a preset threshold value of abnormality detection, or more than a predetermined number of values exceeding a threshold value of the occurrence of the abnormality are included in the status information in the detecting interval.

The method may further include an abnormality detecting reference updater configured to adjust a length of the detecting interval based on the result of the predicting and a change of the status information in a preset verification interval.

The verification interval may start from a time of occurrence of the abnormality in the detecting interval and may end an additional preset time interval after an ending of the detecting interval.

The verification interval may start from an ending of the detecting interval and may end after an additional preset time interval.

The renewing of the abnormality detecting reference may further include comparing the one or more patterns of the past case data with a pattern of the status information in the verification interval; and adjusting the length of the detecting interval based on the prediction result and the abnormality proliferating case or the abnormality diminishing case of past case data having a highest similarity to the pattern of the status information in the verification interval.

The adjusting of the length of the detecting interval may include extending a length of the detecting interval when the status information in the verification interval is similar to a proliferating case among the past case data, even if the predictor has predicted that the abnormality may diminish, and reducing the length of the detecting interval when the predictor has predicted that the abnormality may diminish and the status information in the verification interval is similar to a diminishing case among the past case data.

The adjusting of the length of the detecting interval may include extending a length of the detecting interval when the status information in the verification interval is similar to a diminishing case among the past case data, even if the predictor has predicted that the abnormality may proliferate, and reducing the length of the detecting interval when the status information in the verification interval is similar to a proliferating case among the past case data and the predictor has predicted that the abnormality may proliferate.

According to still another exemplary embodiment of the present disclosure, a computer program stored in a non-transitory computer readable recording medium is provided. The computer program is combined with hardware and is configured to execute: collecting status information of a monitored object; comparing the status information with an abnormality detecting reference in a preset detecting interval and detecting an occurrence of an abnormality of the monitored object; selecting a similar case having a highest degree of similarity to the status information among past case data when the occurrence of the abnormality is detected; and predicting proliferation or diminishing of the detected abnormality using the similar case and an abnormality proliferation predicting reference.

BRIEF DESCRIPTION OF THE DRAWINGS

The above and other objects, and features of the present disclosure will become more apparent to those of ordinary skill in the art by describing, in detail, exemplary embodiments thereof with reference to the accompanying drawings, in which.

DETAILED DESCRIPTION OF EXEMPLARY EMBODIMENTS

Hereinafter, detailed embodiments of the present disclosure will be described with reference to the accompanying drawings. The following detailed description is provided for a more comprehensive understanding of methods, devices and/or systems described in this specification. However, these are only examples, and the present disclosure is not limited thereto.

In descriptions of the disclosure, detailed descriptions of related well-known functions that are determined to unnecessarily obscure the gist of the disclosure will be omitted. Some terms described below are defined in consideration of functions in the disclosure and meanings may vary depending on, for example, a user or operator's intentions or customs. Therefore, the meanings of terms should be interpreted based on the scope throughout this specification. The terminology used in the detailed description is provided only to describe embodiments of the present disclosure and not for purposes of limitation. Unless the context clearly indicates otherwise, the singular forms include the plural forms. It will be understood that the terms "comprises" or "includes," when used herein, specify some features, numbers, steps, operations, elements, and/or combinations thereof, but do not preclude the presence or possibility of one or more other features, numbers, steps, operations, elements, and/or combinations thereof in addition to the description.

Figure 1:
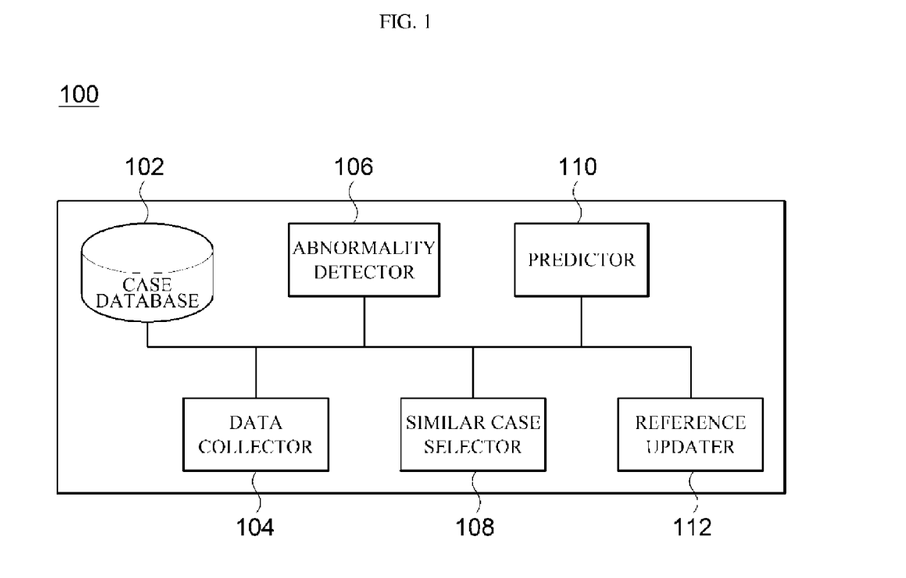
FIG. 1 is a block diagram for describing a configuration of an abnormality detecting and predicting system according to an embodiment of the present disclosure.

FIG. 1 is a block diagram for describing a configuration of an abnormality detecting and predicting system 100 according to an embodiment of the present disclosure. According to the embodiment of the present disclosure, the abnormality detecting and predicting system 100 is a device which collects status information from a monitored object while connected to the monitored object through a wired or a wireless network, detects an abnormality occurrence in the monitored object using the collected status information, and predicts either proliferation or diminishing of the detected abnormality. In an embodiment of the present disclosure, although a monitored object may be an enterprise service device such as a web server, a web application server (WAS), a database, a firewall, a switch, a router, or the like, the present disclosure is not limited to a specific monitored object. Any device or facility in need of abnormality detection may also be the monitored object of the present disclosure. Further, in embodiments of the present disclosure, status information is time-series data consistently collected at regular intervals from a central processing unit (CPU) usage rate or a memory usage rate per second. Further, CPU usage rate may be determined by comparing a number of free clock cycles to a total number of clock cycles in a predetermined period of time.

As illustrated in FIG. 1, according to the embodiment of the present disclosure, the abnormality detecting and predicting system 100 may include a database 102, a data collector 104, an abnormality detector 106, a similar case selector 108, and a predictor 110, and may further include an abnormality detecting reference updater 112 if necessary.

The database 102 is a database for storing and managing past case data related to a status of the monitored object. In the embodiment of the present disclosure, the database 102 stores and manages the monitored object's pattern of changing status information over time when the past abnormality is detected and information of the detected abnormality either proliferating or diminishing in a corresponding case. In an embodiment of the present disclosure, proliferation of the detected abnormality may be referred to as continuation or spreading of the detected abnormality, and diminishing of the detected abnormality may be referred to the opposition of the proliferation of the detected abnormality. A case in which the abnormality has 'diminished' or (hereinafter, a 'diminishing case') refers to a case that returns to a normal state without any particular actions being taken despite the abnormality of the monitored object having been detected, and a case in which the abnormality has 'proliferated' (hereinafter, a 'proliferating case') refers to a case in which a particular action is taken because the abnormality of the monitored object persists or gradually spreads out across other objects.

The data collector 104 collects time-series status information of the monitored object. In the embodiment of the present disclosure, the data collector 104 may be configured to collect status information from the monitored object at a preset data collection interval or a preset collection frequency. The data collection interval may be properly set according to the monitored object and characteristics of collected status information. For example, the data collector 104 may set a short collection interval (e.g., once every second) for rapidly changing data such as CPU usage rates, memory usage rates, or the like, and may set a long collection interval (e.g., once a minute, once every 10 minutes) for relatively slowly changing data such as temperature or humidity data.

Further, when a preset data collection interval is different from a transmission interval of data transmitted from a monitored object, the data collector 104 may process status information received in sync with the data collection interval. For example, when a data collection interval is once a minute and a data transmission interval from a monitored object is ten times a minute, the data collector 104 calculates an average value of data collected at one minute intervals and may set the calculated average value to status information of a corresponding interval.

The abnormality detector 106 compares the status information with an abnormality detecting reference in a preset detecting interval and detects occurrence of an abnormality of the monitored object. In the embodiment of the present disclosure, a detecting interval is referred to as an interval used for detecting an occurrence of an abnormality within collected status information. Generally in the case of time-series data, since the latest data is more important in abnormality detection than the past data based on the present time, the abnormality detector 106 sets a detecting interval to an interval starting from a time of the latest data until a certain time in the past, and detects an abnormality using time-series status information included in the detecting interval.

The abnormality detector 106 stores and manages an additional abnormality detecting reference to detect the occurrence of the abnormality within the detecting interval. The abnormality detecting reference may be set by an administrator of the abnormality detecting and predicting system 100. In an embodiment of the present disclosure, the abnormality detecting reference includes a length of the detecting interval, a threshold value of occurrence of an abnormality and a reference pattern of abnormality detection.

The length of the detecting interval is a length of an interval used for detecting the occurrence of the abnormality in the abnormality detector 106. For example, when the length of the detecting interval is 10 seconds, the abnormality detector 106 detects the occurrence of the abnormality using data from the latest data to 10 seconds before the latest data.

A threshold value of occurrence of an abnormality is a reference value for making a determination of whether or not the abnormality has occurred within the detecting interval. For example, the abnormality detector 106 may determine that the abnormality has occurred when one or more values exceed a preset threshold value within the detecting interval. In an embodiment, the various elements of apparatus 100 are implemented via a CPU, hardware processor, or other computing device including further electronic hardware.

Figure 2:
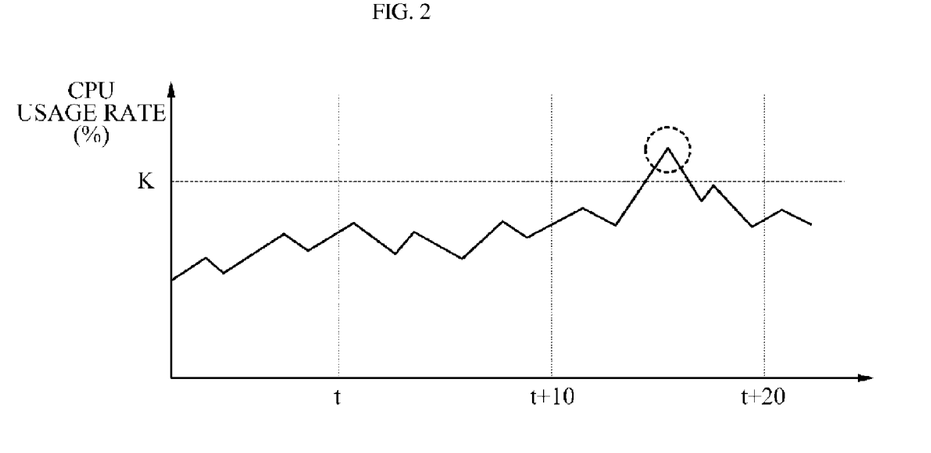
FIG. 2 is an exemplary view for describing a process of determining an abnormality occurrence in a monitored object using a length of a detecting interval and a threshold value of occurrence of an abnormality in the abnormality detector, according to the embodiment of the present disclosure.

FIG. 2 is an exemplary view for describing a process of determining an abnormality occurrence of a monitored object using a length of a detecting interval and a threshold value of occurrence of an abnormality in the abnormality detector 106 according to the embodiment of the present disclosure. As the exemplary view illustrates the monitored object's CPU usage rate (%) over time, a length of a detecting interval is shown as 10 seconds and a threshold value is shown as K.

Referring to FIG. 2, there is no data in which a CPU usage rate exceeds K within a detecting interval 1 from time t to t+10, but there is one instance of data in which a CPU usage rate exceeds K within a detecting interval 2 from time t+10 to t+20 (marked as a dotted circle in the view). Therefore the abnormality detector 106 may determine that no abnormality has occurred within the detecting interval 1 and may determine that the abnormality has occurred within the detecting interval 2.

Meanwhile, the abnormality detecting reference may further include reference patterns of abnormality detection. In this embodiment, the reference patterns of the abnormality detection indicate a time-series shape of data when an abnormality has occurred in the monitored object. Thus, the abnormality detector 106 compares a status information pattern in the detecting interval to the reference patterns of the abnormality detection, and may determine that the abnormality has occurred in the monitored object when the status information matches one of the reference patterns of abnormality detection (that is, when similarity between the patterns is more than a preset value). In this embodiment, similarity between a collected status information pattern and each of the pre-stored reference patterns of abnormality detection may be calculated by properly applying various methods such as cosine similarity, a Euclidean distance, or the like. In the embodiments of the present disclosure, it should be noted that the similarity calculation methodology is not limited to a specific type.

The abnormality detector 106 may determine that an abnormality has occurred in the monitored object when one or more values in the status information exceed the threshold value of the occurrence of the abnormality within the detecting interval, or when the status information matches one of the reference patterns of the abnormality detection, even if no value exceeds a threshold value. Further, the abnormality detector 106 may transmit a warning message to an administrator through visual or auditory methods when the abnormality is determined to have occurred in the monitored object.

The similar case selector 108 selects the most similar case related to the status information among past case data stored in the database 102 when the occurrence of an abnormality is detected from the abnormality detector 106. Specifically, the similar case selector 108 may compare one or more time-series patterns of the past case data stored in the database 102 with a time-series pattern of the status information within the detecting interval, and may select an optimal past case data having the highest similarity to the time-series pattern of the status information as the similar case. Comparison between the time-series pattern of the status information and the one or more patterns of the past case data may be further performed by properly applying various conventionally well-known methods such as cosine similarity, a Euclidean distance, or the like.

The predictor 110 uses the similar case selected from the similar case selector 108 and pre-stored abnormality proliferation prediction reference to predict proliferation or diminishing of a detected abnormality. In an embodiment of the present disclosure, the predictor 110 may predict that a detected abnormality may proliferate when the selected similar case is relevant to an abnormality proliferating case or the status information satisfies the proliferation predicting reference. In other words, the predictor 110 predicts that a detected abnormality is expected to proliferate when a data pattern of an interval in which an abnormality has occurred is relevant to a proliferating case among past case data, or satisfies a preset abnormality proliferation predicting reference, even if the data pattern is not relevant to the proliferating case. On the other hand, the predictor 110 may predict that the detected abnormality may diminish when the similar case is relevant to an abnormality diminishing case, and the status information does not satisfy the proliferation predicting reference.

The abnormality proliferation reference may reference the following items.

1. An average value of status information in a detecting interval exceeds a threshold value of abnormality detection.
2. The number of values exceeding a threshold value of occurrence of an abnormality more than a reference number is included in status information of a detecting interval.

The predictor 110 may determine that a detected abnormality satisfies a proliferation predicting reference when one of the items 1 and 2 is satisfied.

Meanwhile, as described above, the abnormality detecting and predicting system 100 according to the embodiment of the present disclosure may further include the abnormality detecting reference updater 112. The abnormality detecting reference updater 112 adjusts a length of the detecting interval based on a prediction result of the predictor 110 and a change of status information in a preset verification interval.

Figure 3:
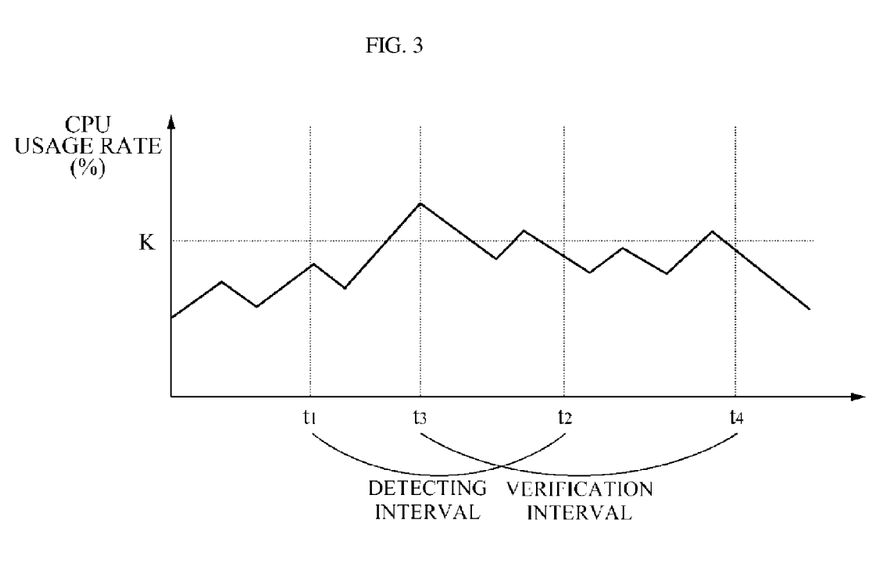
FIGS. 3 and 4 are exemplary views for describing a verification interval according to an embodiment of the present disclosure.

In the embodiment of the present disclosure, a verification interval may be an interval from a start time at which an abnormality has occurred in the detecting interval until an elapsed time of a preset interval after an ending of the detecting interval. FIG. 3 is an illustration of the above description. When an abnormality occurrence begins at $t_3$ located in a detecting interval between $t_1$ and $t_2$, a verification interval is an interval between $t_3$ and $t_4$.

Figure 4:
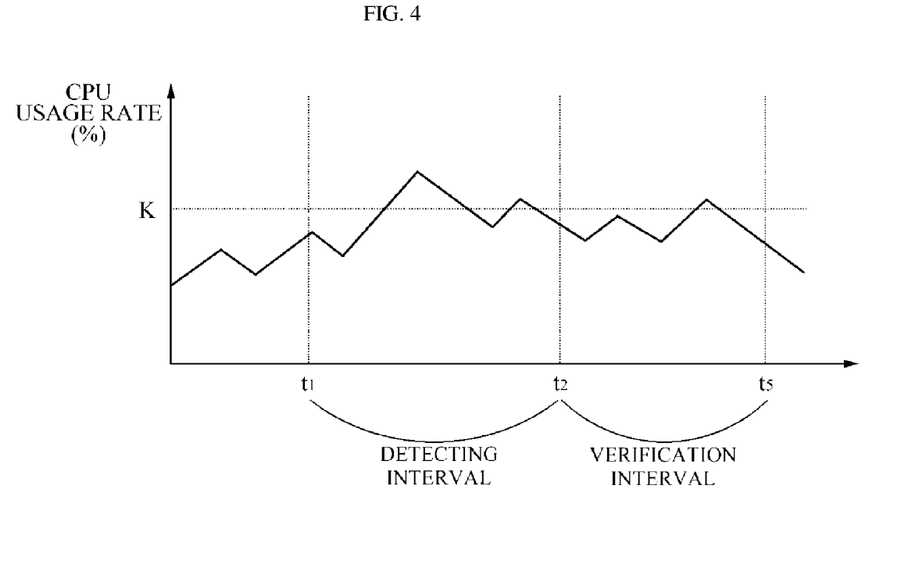

In another embodiment of the present disclosure, a verification interval may be an interval from an end time of the detecting interval until after an elapsed time of a preset interval. FIG. 4 is an illustration of the above description. When an abnormality occurrence begins at a certain time located in a detecting interval between $t_1$ and $t_2$, a verification interval is an interval between $t_2$ and $t_5$, wherein $t_2$ is an end time of the detecting interval.

The abnormality detecting reference updater 112 compares one or more patterns of past case data stored in the database 102 with the status information pattern in the verification interval and determines whether status information in the verification interval is more similar to a proliferating case or a diminishing case. The abnormality detecting reference updater 112 may compare a status information pattern in the verification interval and the past case stored in the database 102 using the same algorithm from the similar case selector 108. Then, the abnormality detecting reference updater 112 adjusts a length of the detecting interval using a proliferation or diminishing condition of status information in the verification interval and a prediction result from the predictor 110.

In an embodiment of the present disclosure, the abnormality detecting reference updater 112 may extend a length of a detecting interval when status information in a verification interval is similar to a proliferating case among past case data, even if the predictor 110 has predicted that an abnormality may diminish, and may reduce the length of the detecting interval when status information in the verification interval is similar to a diminishing case among the past case data and the predictor 110 has predicted that an abnormality may diminish.

Further, the abnormality detecting reference updater 112 may extend a length of a detecting interval when status information in a verification interval is similar to a diminishing case among the past case data, even if an abnormality is predicted to proliferate by the predictor 110, and may reduce the length of the detecting interval when status information in the verification interval is similar to a proliferating case among past case data and an abnormality is predicted to proliferate by the predictor 110.

Specifically, the abnormality detecting reference updater 112 may adjust a length of a detecting interval as following.

1. First, the abnormality detecting reference updater 112 extends a length of a detecting interval when the status information in a verification interval is relevant to a proliferating case, even if the predictor 110 has predicted that an abnormality may diminish. Thus, the above-described case is determined to be a case in which abnormality proliferation has not been detected properly due to a length of a detecting interval being too small, and thus the length of the detecting interval is extended to include the verification interval to a detecting interval. Here, an extension of a width of the detecting interval may be properly set in consideration of a monitored object and characteristics of status information.

2. When the predictor 110 has predicted that an abnormality may diminish and status information in a verification interval is similar to a diminishing case, the abnormality detecting reference updater 112 reduces a length of a detecting interval. Thus, in the above-described case, the predictor 110 quickly predicts diminishing of an abnormality by reducing a length of a detecting interval and prevents an unnecessary alarm. Here, a reduction of a width of the detecting interval may be properly set in consideration of a monitored object and characteristics of status information.

3. When status information in a verification interval is similar to a diminishing case but an abnormality is predicted to proliferate by the predictor 110, the abnormality detecting reference updater 112 extends a length of a detecting interval in the same way as in item 1.

4. When the predictor 110 predicts that an abnormality may proliferate and the status information in the verification interval is similar to a proliferating case among past case data, the abnormality detecting reference updater 112 reduces a length of a detecting interval in the same way as in item 2.

Figure 5:
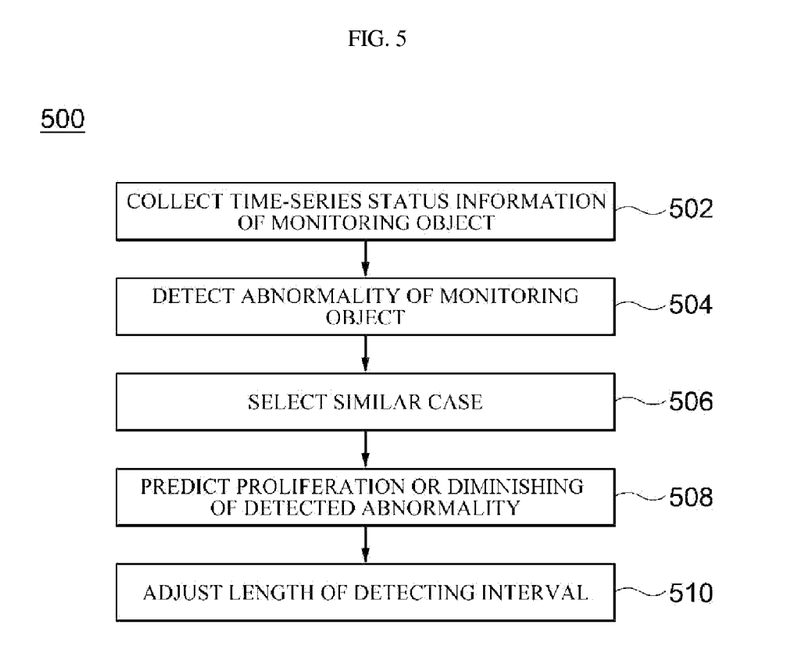
FIG. 5 is a flowchart for describing a method of detecting and predicting an abnormality according to an embodiment of the present disclosure.

FIG. 5 is a flowchart for describing a method of detecting and predicting an abnormality 500 according to an embodiment of the present disclosure. According to the embodiment of the present disclosure, the method of detecting and predicting the abnormality 500 may be performed by the above-described abnormality detecting and predicting system 100.

The data collector 104 collects time-series status information of a monitored object (502).

The abnormality detector 106 compares the status information and an abnormality detecting reference in a preset detecting interval and detects an abnormality occurrence of the monitored object (504). Here, the abnormality detecting reference may include a length of the detecting interval, a threshold value of occurrence of an abnormality, and reference patterns of abnormality detection.

Further, the abnormality detector 106 may determine that an abnormality has occurred in the monitored object when there is at least one value exceeding the threshold value of the occurrence of the abnormality in the status information in the detecting interval, or when the status information matches one of the reference patterns of abnormality detections. Further, the abnormality detector 106 may output a warning message when the abnormality is determined to have occurred in the monitored object.

When an abnormality occurrence is detected in 504, the similar case selector 108 selects a case having the highest degree of similarity with the status information among past case data store in the database 102 (506). Specifically, the similar case selector 108 may compare one or more patterns of the past case data with the status information pattern in the detecting interval, and may select the similar case from the past case data having the highest similarity with the status information pattern.

The predictor 110 predicts proliferation or diminishing of an abnormality detected using the similar case selected in 506 and an abnormality proliferation predicting reference (508). Specifically, the predictor 110 may predict that a detected abnormality may proliferate when the selected similar case is relevant to an abnormality proliferating case or the status information satisfies the proliferation predicting reference, and may predict that the detected abnormality may diminish when the similar case is relevant to an abnormality diminishing case and the status information does not satisfy the proliferation predicting reference, the prediction being a prediction result.

Further, the predictor 110 may determine that the proliferation predicting reference is satisfied when an average value of the status information in the detecting interval exceeds a preset threshold value of abnormality detection, or the status information in the detecting interval includes more than a predetermined number of values exceeding the threshold value of the occurrence of the abnormality.

The abnormality detecting reference updater 112 adjusts a length of the detecting interval based on the prediction result and a change of the status information in a preset verification interval (510).

In an embodiment of the present disclosure, the verification interval may start from a time of occurrence of an abnormality in the detecting interval and may end an additional preset time interval after an ending of the detecting interval. In another embodiment of the present disclosure, the verification interval may start from an ending of the detecting interval and may end after an additional preset time interval.

Specifically, the abnormality detecting reference updater 112 compares one or more patterns of the past case data with a pattern of the status information in the verification interval, and adjusts a length of the detecting interval based on a prediction result in 508 and proliferation or diminishing of an abnormality of status information in a verification interval. Details on a process of adjusting a length of a detecting interval have been described above.

Meanwhile, the embodiments of the present disclosure may include a program for executing methods described in this specification in a computer and a non-transitory computer readable recording medium including the program. The computer readable recording medium may include program instructions, a local data file, a local data structure, and/or a combination thereof. The medium may be specifically designed and prepared for the embodiment of the present disclosure or may be an available medium that is known to those skilled in the field of computer software. Examples of the computer readable recording medium include magnetic media such as a hard disk, a floppy disk, and a magnetic tape, optical media such as a CD-ROM and a DVD, and a hard device such as a ROM, a RAM, or a flash memory, that is specifically made to store and perform the program instructions. Examples of the program instructions may include a machine code generated by a compiler and a high-level language code that can be executed in a computer using an interpreter.

According to embodiments of the present disclosure, an abnormality of a monitored object may be promptly detected through a combination of time-series data collected in real time and past case data, and proliferation or diminishing of the detected abnormality may be effectively predicted.

Further, according to embodiments of the present disclosure, an abnormality of a monitored object may be effectively detected by dynamically changing a detecting condition based on a prediction result of proliferation or diminishing of a detected abnormality and actual proliferation or diminishing.

While the present disclosure has been described above in detail with reference to representative embodiments, it may be understood by those skilled in the art that the embodiments may be variously modified without departing from the scope of the present disclosure. Therefore, the scope of the present disclosure is defined not only by the described embodiments but also by the appended claims, and encompasses equivalents that fall within the scope of the appended claims.

What is claimed is:

1. An abnormality detecting and predicting system, comprising:
    a database configured to store past case data related to a state of a monitored object;
    a data collector configured to collect status information from the monitored object;
    an abnormality detector configured to compare the status information, in a preset detecting interval, with an abnormality detecting reference, and to detect an occurrence of an abnormality of the monitored object;
    a similar case selector configured to select a first case having a highest degree of similarity to the status information among the past case data when the occurrence of the abnormality is detected by the abnormality detector;
    a predictor configured to predict proliferation or diminishing of the detected abnormality after the occurrence of the detected abnormality, by using the first case and an abnormality proliferation predicting reference; and
    an abnormality detecting reference updater configured to adjust a length of the preset detecting interval based on a prediction result of the predictor and a change of the status information in a preset verification interval,
    wherein the abnormality detector is further configured to transmit a warning message to an administrator in response to the occurrence of the abnormality of the monitored object,
    wherein the past case data includes the monitored object's pattern of changing status information over time when a past abnormality is detected and information of the detected past abnormality either proliferating or diminishing in a corresponding case,
    wherein the preset verification interval corresponds to one of a first interval starting from a time of the occurrence of the abnormality in the preset detecting interval and ending at an additional preset time interval after an ending of the preset detecting interval, and a second interval which starts from the ending of the preset detecting interval and ending after the additional preset time interval, and
    wherein the data collector, the abnormality detector, the similar case selector, and the predictor are executed by at least one central processing unit (CPU) or at least one hardware processor.

2. The system of claim 1, wherein the abnormality detecting reference comprises:
    the length of the preset detecting interval;
    a threshold value of the occurrence of an abnormality; and
    at least one reference pattern of abnormality detection.

3. The system of claim 2, wherein the abnormality detector determines that the abnormality has occurred in the monitored object when there is at least one value exceeding the threshold value of the occurrence of the abnormality in the status information in the preset detecting interval, or the status information matches the at least one reference pattern of the abnormality detection.

4. The system of claim 1, wherein the warning message is one of a visual message and an auditory message.

5. The system of claim 1, wherein the similar case selector compares one or more patterns of the past case data with a pattern of the status information in the preset detecting interval, and selects an optimal past case data having a highest degree of similarity to the pattern of the status information as the first case.

6. The system of claim 1, wherein the predictor predicts that a detected abnormality is proliferated when the first case is relevant to an abnormality proliferating case or the status information satisfies the abnormality proliferation predicting reference, and predicts that the detected abnormality diminishes when the first case is relevant to an abnormality diminishing case and the status information does not satisfy the abnormality proliferation predicting reference, to yield the prediction result.

7. The system of claim 6, wherein the predictor determines that the abnormality proliferation predicting reference is satisfied when an average value of the status information in the preset detecting interval exceeds a preset threshold value of abnormality detection, or more than a predetermined number of values exceeding a threshold value of the occurrence of the abnormality are included in the status information in the preset detecting interval.

8. The system of claim 1, wherein the abnormality detecting reference updater compares one or more patterns of the past case data with a pattern of the status information in the preset verification interval, and adjusts the length of the preset detecting interval based on the prediction result and proliferation or diminishing of the abnormality using the past case data having a highest similarity to the pattern of the status information in the preset verification interval.

9. A method of detecting and predicting an abnormality, comprising:
    collecting status information from a monitored object;
    comparing the status information and an abnormality detecting reference in a preset detecting interval, and detecting an occurrence of an abnormality of the monitored object;

selecting a first case having a highest degree of similarity to the status information among past case data when the occurrence of the abnormality is detected;

predicting proliferation or diminishing of the detected abnormality after the occurrence of the detected abnormality, by using the first case and an abnormality proliferation predicting reference;

adjusting a length of the preset detecting interval based on a prediction result and a change of the status information in a preset verification interval; and transmitting a warning message to an administrator in response to the occurrence of the abnormality of the monitored object, wherein the past case data includes the monitored object's pattern of changing status information over time when a past abnormality is detected and information of the detected past abnormality either proliferating or diminishing in a corresponding case, and wherein the preset verification interval corresponds to one of a first interval starting from a time of the occurrence of the abnormality in the preset detecting interval and ending at an additional preset time interval after an ending of the preset detecting interval, and a second interval which starts from the ending of the preset detecting interval and ending after the additional preset time interval.

10. The method of claim 9, wherein the abnormality detecting reference comprises:
the length of the preset detecting interval;
a threshold value of the occurrence of an abnormality; and
at least one reference pattern of abnormality detection.

11. The method of claim 10, wherein the detecting of the occurrence of the abnormality includes determining that the abnormality has occurred in the preset detecting interval when one or more values in the status information exceed the threshold value of the occurrence of the abnormality in the preset detecting interval, or the status information matches the at least one reference pattern of the abnormality detection.

12. The method of claim 9, wherein
the warning message is one of a visual message and an auditory message.

13. The method of claim 9, wherein the selecting of the first case includes comparing one or more patterns of the past case data with a pattern of the status information in the preset detecting interval, and selecting an optimal past case data having a highest degree of similarity to the pattern of the status information as the first case.

14. The method of claim 9, wherein the predicting includes predicting that a detected abnormality is proliferated when the first case is relevant to an abnormality proliferating case or the status information satisfies the abnormality proliferation predicting reference, and predicting that the detected abnormality diminishes when the first case is relevant to an abnormality diminishing case 5 and the status information does not satisfy the abnormality proliferation predicting reference, to yield the prediction result.

15. The method of claim 14, wherein the predicting includes determining that the abnormality proliferation predicting reference is satisfied when an average value of the status information in the preset detecting interval exceeds a preset threshold value of abnormality detection, or more than a predetermined number of values exceeding a threshold value of the occurrence of the abnormality are included in the status information in the preset detecting interval.

16. The method of claim 9, wherein the adjusting the length of the preset detecting interval further comprises:
comparing one or more patterns of the past case data with a pattern of the status information in the preset verification interval; and
adjusting the length of the preset detecting interval based on the prediction result and proliferation or diminishing of the abnormality using the past case data having highest similarity to the pattern of the status information in the preset verification interval.

17. A computer program stored in a non-transitory computer-readable recording medium combined with hardware, the computer program configured to execute:
collecting status information of a monitored object;
comparing the status information with an abnormality detecting reference in a preset detecting interval and detecting an occurrence of an abnormality of the monitored object;
selecting a first case having a highest degree of similarity to the status information among past case data when the occurrence of the abnormality is detected;
predicting proliferation or diminishing of the detected abnormality after the occurrence of the detected abnormality, by using the first case and an abnormality proliferation predicting reference;
adjusting a length of the preset detecting interval based on a prediction result and a change of the status information in a preset verification interval; and
transmitting a warning message to an administrator in response to the occurrence of the abnormality of the monitored object,
wherein the past case data includes the monitored object's pattern of changing status information over time when a past abnormality is detected and information of the detected past abnormality either proliferating or diminishing in a corresponding case, and
wherein the preset verification interval corresponds to one of a first interval starting from a time of the occurrence of the abnormality in the preset detecting interval and ending at an additional preset time interval after an ending of the preset detecting interval, and a second interval which starts from the ending of the preset detecting interval and ending after the additional preset time interval.

* * * * *